July 9, 1929.  B. T. WALSH  1,720,583
PISTON RING
Filed Oct. 3, 1927
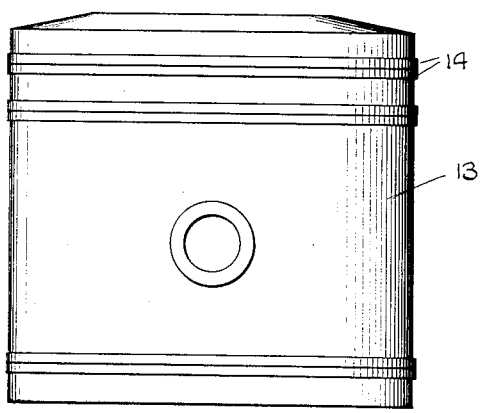
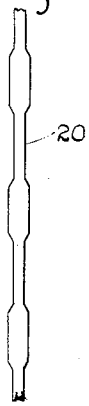
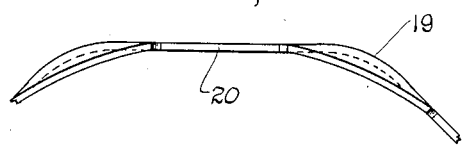
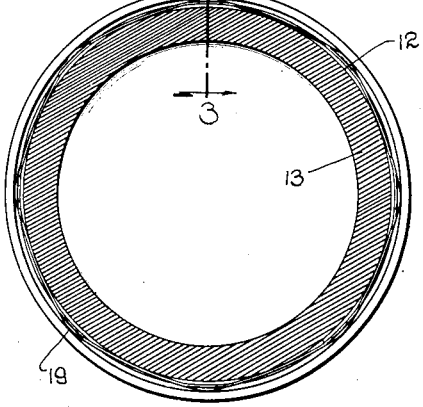
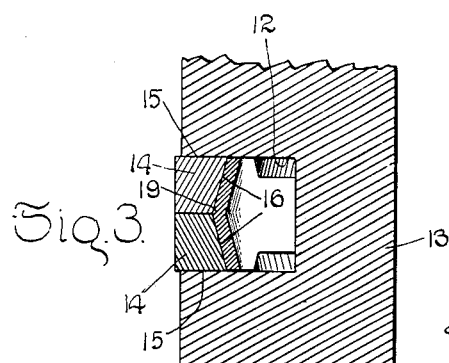
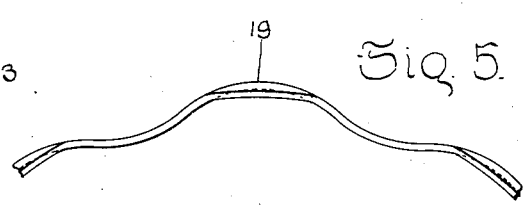
Inventor
Burton T. Walsh
By Joshua R. H. Potts
His Attorney Patented July 9, 1929.

1,720,583

UNITED STATES PATENT OFFICE.

BURTON T. WALSH, OF CHICAGO, ILLINOIS.

PISTON RING.

Application filed October 3, 1927. Serial No. 223,514.

This invention relates to piston rings, and has for its object the provision of a piston ring construction particularly adapted to maintain compression within the cylinders of a hydrocarbon motor.

Another object of my invention is to provide a piston ring construction adapted to prevent the oil seepage and the oil pumping characteristic of conventional types of piston rings.

Other objects and advantages of the method and construction herein described will appear more fully in the hereinafter specification when taken in connection with the accompanying drawing, in which, Figure 1 is a perspective view of a piston showing my novel piston rings in position thereon.

Figure 2 is a cross section of a piston showing a ring and an expansible polygonal shaped ring within a piston groove.

Figure 3 is a cross sectional view taken on line 3—3 of Figure 2.

Figure 4 is a fragmentary plan view of one of my expansible polygonal shaped rings.

Figure 5 is a fragmentary plan view of another of my expansible polygonal shaped rings.

Figure 6 is a fragmentary elevation of one of my expansible polygonal shaped rings.

Referring more particularly to the drawings in which similar characters of reference are applied to like parts in the several views, 12 and 12' are annular grooves of a conventional piston 13. 14 is a pair of my piston rings having a flat cylinder engaging surface 15 and an inner beveled surface 16, forming, when placed side by side in the piston groove, a wedge-shaped recess 17 in which a resilient polygon (in the present instance an octagon) 18 having a crowned portion 19 and cut away parts 20, is adapted to fit.

In Figure 3, the piston rings are shown as they would appear in an unworn groove 12, while in groove 12' the rings are slightly separated, disclosing a slot 21,—this condition revealing the widening of the groove as it would occur through use, and the manner in which my piston ring construction is adapted to prevent gas and oil leakage in a worn condition of the groove, as illustrated.

The functions and operation of my piston ring construction will now be understood upon referring to the drawing in connection with the following description: Assuming that the piston is new, the two piston rings 14 will snugly engage the side walls of the piston groove, while at the same time the coinciding faces of the piston rings will exhibit no space or slot between their mutually engaging surfaces,—this condition being shown in upper groove 12 of Figure 3,—the expansible polygon 16 serving to resiliently impel the piston rings 14 into contact with the groove walls, at the same time preventing loss of compression and leakage of oil.

I have found the method and construction herein described to be in the highest degree efficient for the purpose indicated. It is to be particularly noted that by reason of the simplicity of structure of my piston rings and resilient expansible members, the actual cost of manufacture is considerably less than in the many types of rings having a comparatively complex structure.

Particular attention is called to the novel mechanical advantages to be obtained by virtue of the polygonal shaped member 18, the sides of which by reason of the elastic material of which it is made, are resiliently urged against the inner surfaces of the piston rings 14 and 15 in a manner to wedgingly press them into contact with the side walls of the piston grooves.

While I have herein described and in the accompanying drawings illustrated a preferred form of my invention with particularity, I do not thereby desire nor intend to limit myself specifically thereto, as it will be understood that minor changes of construction may be made, if desired, without departing from the spirit and scope of the invention as defined in the appended claims.

I claim as my invention:

1. A piston ring construction comprising a pair of split rings having inner beveled surfaces, and a resilient beveled member having a polygonal shaped peripheral contour and sides registering with corresponding sides of said pair of split rings and adapted to wedgingly engage and spread the said split rings apart, substantially as described.

2. A piston ring construction comprising a pair of split rings arranged side by side and having inner beveled surfaces adapted to receive corresponding beveled surfaces on an expansible member having the over-all configuration of a polygon, said expansible member also having crowned beveled surfaces thereon which serve to wedgingly enter a recess formed between said pair of split rings.

In testimony whereof I have signed my name to this specification.

BURTON T. WALSH.